Dec. 23, 1941.     J. B. WEST     2,267,486
HYDRATOR
Filed Sept. 24, 1940

Inventor
JOHN B. WEST
By C. James Cottrell
Attorney

Patented Dec. 23, 1941

2,267,486

UNITED STATES PATENT OFFICE 2,267,486

HYDRATOR

John B. West, New York, N. Y.

Application September 24, 1940, Serial No. 358,060

2 Claims. (Cl. 62—89)

This invention relates to hydrators especially adapted for use in refrigerating apparatus.

One of the common objections to mechanical refrigerating apparatus is that a dry cold air is produced which draws the moisture from vegetables, and other food products, thus destroying the desired natural crispness. To overcome this objection, it has been the practice to moisten vegetables, fruits, and the like, and place the moistened articles in a covered receptacle. The cover of the receptacle serves as a sort of hydrator, as moisture is drawn from the vegetables, etc. up to the cold surface of the cover, where it is condensed and falls back upon the products being hydrated. While such a device is more effective than the mere exposing of products to dry air, it has been found that the moisture collects on the flat surface of the cover and does not drip back upon the products as rapidly as desired in order to provide crisp vegetables, etc. for a reasonable length of time.

It is, therefore, an object of this invention to provide a hydrator of such construction that moisture accumulating thereon will promptly drip back down on food products to keep them constantly fresh over an indefinite period of time.

A further object is the provision of a hydrator having a surface provided with a plurality of sharp ridges from which condensed water will rapidly fall.

These and other advantageous objects which will later appear, are accomplished by the simple and practical construction and arrangement of parts hereinafter described and shown in the accompanying drawing, forming a part hereof, and in which.

Figure 1:
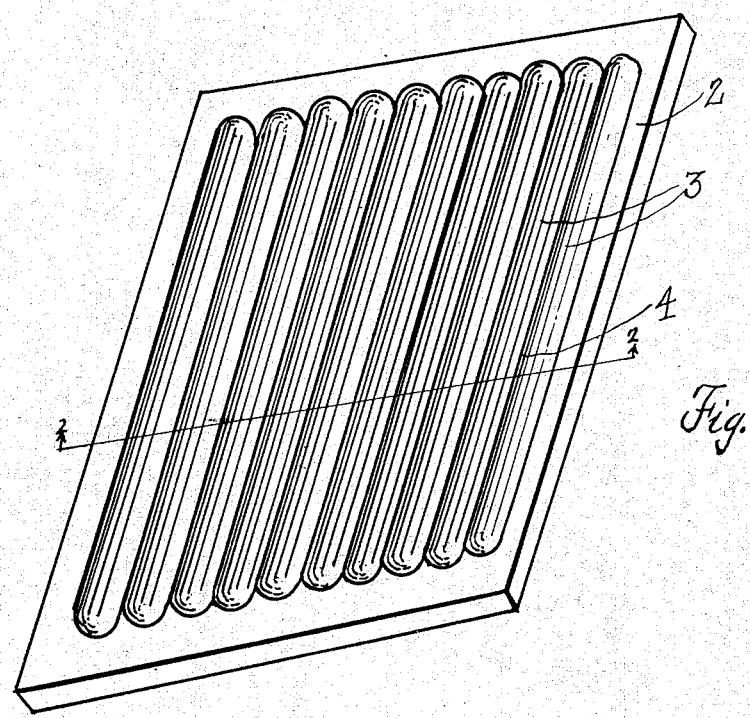
Fig. 1 is a bottom perspective view of a hydrator embodying the invention.

Referring to the drawing, in Fig. 1, the hydrator is shown to comprise a plate 1, having smooth end portions 2, adapted to firmly engage the walls of a receptacle 5. The center of plate 1 is provided with a plurality of elongated U-shaped grooves 3, the walls of adjacent grooves merging into sharp ridges 4.

Figure 2:
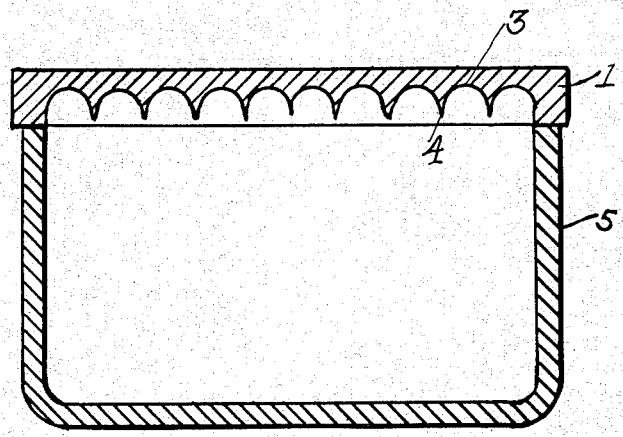
Fig. 2 is a sectional view of the hydrator taken on line 2—2 of Fig. 1 and positioned as a cover for a receptacle.

In operation, the hydrator is placed over a receptacle as a cover, see Fig. 2, the vegetables, etc. in the receptacle having previously been moistened. As the hydrator becomes chilled, moisture from the vegetables, etc., will rise and condense in the U-shaped grooves 3 and flow down to the ridges 4, from which drops of water will rapidly fall back upon the articles being hydrated.

It has been found that a U-shaped groove provides a minimum amount of capillary attraction so that the condensed water will not persist in the grooves, but will readily flow to the sharp ridges 4.

From the above description it will be seen that there has been provided a simple and highly effective hydrator for maintaining food products fresh for a considerable period of time. The hydrator is preferably made of glass or a plastic compound such as "Catalin," but obviously it may be made from other substances without departing from the spirit of the invention.

A modified form of the invention may comprise a metal plate stamped to form U-shaped grooves and ridges, which operate on the same principle as above described. The metal used in this form would be a non-rusting, non-corroding metal.

Instead of providing the plate with elongated grooves, an effective hydrator can also be produced by providing one side of the plate with a plurality of sharp pointed projections or the like.

The foregoing disclosure is to be regarded as descriptive and illustrative only and not as restrictive or limitative of the invention, of which, obviously, embodiments may be constructed, including modifications, without departing from the scope of the invention herein set forth and denoted in the appended claims.

Having thus described the invention, what I desire to secure by Letters Patent and claim, is:

1. A hydrating device for refrigerators, comprising a receptacle, and a plate covering the receptacle, said plate having one side thereof formed with a plurality of elongated grooves, the walls of adjacent grooves merging into sharp ridges, said grooved side being directed towards the interior of the receptacle.

2. A hydrating device for refrigerators, comprising a receptacle, and a plate covering the receptacle, said plate having one side thereof formed with a plurality of U-shaped grooves, the walls of adjacent grooves merging to form sharp edged ridges, said grooved side being directed towards the interior of the receptacle.

JOHN B. WEST.